US012800415B2

(12) United States Patent
Jurnet Berteloot et al.

(10) Patent No.: US 12,800,415 B2
(45) Date of Patent: Nov. 17, 2026

(54) APPARATUS INCLUDING A SELF-PROPELLED UNMANNED GROUND VEHICLE FOR COLLECTING ENVIRONMENTAL DATA FROM A SPORTS FIELD, TO ASSIST WITH MANAGEMENT OF OUTDOOR SPORTS FIELDS AND SURFACES

(71) Applicant: E-NANO LTD, London (GB)

(72) Inventors: Alan Jurnet Berteloot, London (GB); Gabriel Zichy, London (GB); Erwann Lompech Leneveu, London (GB); Christian Von Scheidt, London (GB)

(73) Assignee: E-NANO LTD, London (GB)

( * ) Notice: Subject to any disclaimer, the term of this patent is extended or adjusted under 35 U.S.C. 154(b) by 240 days.

(21) Appl. No.: 18/728,662

(22) PCT Filed: Jan. 13, 2023

(86) PCT No.: PCT/GB2023/050066
§ 371 (c)(1),
(2) Date: Jul. 12, 2024

(87) PCT Pub. No.: WO2023/135430
PCT Pub. Date: Jul. 20, 2023

(65) Prior Publication Data

US 2025/0116560 A1 Apr. 10, 2025

(30) Foreign Application Priority Data

Jan. 14, 2022 (GB) ..................................... 2200479

(51) Int. Cl.
*G01L 5/00* (2006.01)
*A01B 45/00* (2006.01)
*A01B 69/04* (2006.01)
*A01B 79/00* (2006.01)
*G01D 21/00* (2006.01)
(Continued)

(52) U.S. Cl.
CPC ................ *G01L 5/00* (2013.01); *G01N 21/84* (2013.01); *G01N 2021/8466* (2013.01)

(58) Field of Classification Search
CPC .. G01L 5/00; G01N 21/84; G01N 2021/8466; G06Q 20/38; H04L 9/08; H04L 9/38;
(Continued)

(56) References Cited

U.S. PATENT DOCUMENTS 8,220,339 B1 7/2012 Scherbring
2018/0242515 A1 8/2018 Yajima et al.
(Continued)

FOREIGN PATENT DOCUMENTS

CN 110771483 A 2/2020
EP 3178531 A1 * 6/2017 ............. A63B 71/02
(Continued)

OTHER PUBLICATIONS

International Search Report and Written Opinion issued in corresponding International Patent Application No. PCT/GB2023/050066, dated Mar. 16, 2023, 14 pages.
(Continued)

*Primary Examiner* — Brandi N Hopkins
(74) *Attorney, Agent, or Firm* — Morgan, Lewis & Bockius LLP

(57) ABSTRACT

The apparatus comprises an unmanned ground vehicle having a sensing mechanism. The sensing mechanism includes an actuator for moving a sensing component between a first position where the sensing component is retracted, and a second position where the sensing component is deployed. During use, the unmanned ground vehicle moves through a plurality of waypoints on a sports surface, and when a predetermined waypoint is reached, a controller operates the
(Continued)

actuator to move the sensing component to its second deployed position so that data can be collected from the sports surface.

17 Claims, 13 Drawing Sheets

(51) Int. Cl.
*G01D 21/02* (2006.01)
*G01N 21/84* (2006.01)

(58) Field of Classification Search
CPC .... H04L 9/06; H04L 9/32; H04L 9/00; G07C 5/00; G07C 5/04; G07C 5/08; B60W 50/00
See application file for complete search history.

(56) References Cited

U.S. PATENT DOCUMENTS

| | | | |
|---|---|---|---|
| 2019/0357430 | A1 | 11/2019 | Kraft |
| 2020/0255139 | A1 | 8/2020 | Nahuel-Andrejuk et al. |

FOREIGN PATENT DOCUMENTS

| | | | | | |
|---|---|---|---|---|---|
| EP | 3 827 654 | A1 | | 6/2021 | |
| GB | 2386970 | A | * | 10/2003 | ............. B60K 31/04 |
| WO | 2003/038730 | A1 | | 5/2003 | |
| WO | 2019/100118 | A1 | | 5/2019 | |

OTHER PUBLICATIONS

Biraderoglu Metin et al: “Spatio-temporal investigation of surface soil hardness on professional football field”, Environmental Monitoring and Assessment, Springer International Publishing, Cham, vol. 192, No. 2, Jan. 30, 2020 (Jan. 30, 2020), XP037002460, ISSN: 0167-6369, DOI: 10.1007/S10661-020-8087-7 [retrieved on Jan. 30, 2020] the whole document.
Examination Report issued in corresponding GB Patent Application No. GB2200479.0, dated May 16, 2024, 4 pages.
Search Report issued in corresponding GB Patent Application No. GB2200479.0, dated Jul. 13, 2022, 7 pages.

* cited by examiner

100

100

100

100

150

APPARATUS INCLUDING A SELF-PROPELLED UNMANNED GROUND VEHICLE FOR COLLECTING ENVIRONMENTAL DATA FROM A SPORTS FIELD, TO ASSIST WITH MANAGEMENT OF OUTDOOR SPORTS FIELDS AND SURFACES

CROSS REFERENCE TO RELATED APPLICATIONS

This application is a 371 National Stage Entry of International Patent Application No. PCT/GB2023/050066 filed Jan. 13, 2023, which claims priority to GB Patent Application No. 2200479.0 filed Jan. 14, 2022, each of which is incorporated herein by reference in its entirety.

FIELD OF THE INVENTION

The present invention relates to the management of outdoor sports fields and surfaces, and more specifically to the collection of soil, turf and environmental data from such fields and surfaces for use in managing the performance and maintenance of such sports fields or surfaces and reducing player injuries.

BACKGROUND TO THE INVENTION

When managing sports fields or surfaces (e.g. football pitches, tennis courts, golf courses, horse racing tracks, etc.) there is a need to obtain reliable, precise and repeatable data on the state of the sports field or surface, including soil, plant (turf) and environmental data. In addition to understanding the current performance (e.g. soil and turf health) of a sports field or surface, such data can also be analysed to create preventative maintenance plans that might be required and mitigate player injuries.

Sports fields and surfaces can often cover large areas, therefore making the manual collection of data difficult and imprecise for grounds keeping personnel. The data so acquired is often imprecise and unreliable as repeatability is hard to achieve. Moreover, the task itself becomes a matter of contempt due to its inherent difficulty. An autonomous solution for collecting soil, turf and environmental data from sports fields and surfaces is therefore highly needed.

Existing solutions are limited in that they may not provide autonomous collection of data and/or for the measurement of multiple variables from the sports field or surface. For example, existing solutions may be limited to the collection of a specific type of "intrusive" data (i.e. data obtained from the insertion of sensors into the sports surface) or may be limited to the collection of a specific type of "non-intrusive" data (i.e. data obtained through non-contact with the sports field or surface). Furthermore, existing solutions may not allow for the frequency of measurements, or the granularity of measurements required to optimise the performance of a sports field or surface.

Furthermore, existing solutions that utilize intrusive sensors are not able to determine and vary precisely the depth to which the sensor is inserted. For example, existing solutions may apply a constant force or weight to the sensor, may rely on momentum of the sensor to embed it within the sports surface, or may simply deploy a probe sensor periodically, without any fine control over when measurements are taken. In addition, the depth reached by those sensors will typically depend on the properties of the turf, such as its hardness, and thus those sensors may not consistently reach the optimum depth required for data collection according to the specific turf being measured.

SUMMARY OF THE INVENTION

Disclosed herein is a sensing assembly for collecting data from a sports field or surface, comprising: a sensing mechanism arranged to have mounted thereto at least one sensing component for collecting data from the sports surface, the sensing mechanism being configured to move the sensing component between a first position, in which said sensing component is retracted, and a second position, in which said sensing component is deployed; an actuator configured to actuate the sensing mechanism to move said sensing component between the first and second positions; and a controller configured to control actuation of the sensing mechanism via the actuator.

Preferably, the controller is configured to control actuation of the sensing mechanism when a waypoint (e.g. a desired location or position on the sports field or surface at which the sensing component may be deployed) is reached.

The controller may be further configured to determine the first and second positions of a sensing component on the sensing mechanism according to the type of sensing component mounted thereto, thereby to control actuation of the sensing mechanism such that said sensing component is correctly positioned, relative to the sports surface, for collecting data when in the second position.

Preferably, the sensing component may be configured for insertion to a predetermined depth into the sports surface and the controller may therefore be configured to determine said first and second positions such that said sensing component is inserted to said predetermined depth into the sports surface when in the second position.

The assembly may further comprise a proximity sensor configured to detect the presence of objects around the sensing mechanism, wherein the controller is further configured to pause or inhibit actuation of the sensing mechanism when objects are detected within a predetermined distance. The proximity sensor may comprise at least one of the following: an ultrasonic sensor, a LIDAR sensor, and/or a depth camera.

Preferably, operation of the assembly is automated and/or the assembly is preferably configured to operate autonomously. More preferably, the sensing mechanism is automated, i.e. it is an automated sensing mechanism.

The sensing mechanism may comprise a slotted arrangement for mounting a sensing component adapted to be mounted thereto. The sensing component may comprise a sensor module, comprising a housing configured to house a sensor, preferably wherein the sensor is interchangeable with another sensor. The sensor module may further comprise a load cell arranged to measure a force applied to the sensing component when inserted into the sports surface, for example wherein the controller may be configured to control the actuator to move the sensing mechanism to the first position if the force measured by the load cell is outside a predetermined range.

The sensing mechanism may be configured to have mounted thereto a plurality of sensing components, and wherein the sensing mechanism is further configured to move a mounted sensing component between first and second positions for individual sensing components of said plurality of sensing components.

The sensing mechanism may be arranged to have mounted thereto an intrusive sensing component configured to collect data via contact with the sports surface. The sensing mechanism may be configured to move said one or more sensing components linearly between the first and second positions, preferably in a direction that is substantially normal/perpendicular to the sports surface. The sensing mechanism comprises one or more shafts along which said sensing component is moved between the first and second positions. One or more sensors may be provided for determining the position of the sensing mechanism along the one or more shafts, and the one or more sensors may be configured to feedback the position of the sensing mechanism to the controller.

The sensing mechanism may be configured to have mounted thereto non-intrusive sensing components that are configured to collect data via non-contact with the sports surface. The sensing component may comprise an optical sensor and the sensing mechanism may comprise a hinged arm on which the optical sensor is mounted, wherein the optical sensor may be concealed in the first position, and the optical sensor may be aligned (e.g. parallel or perpendicular, as appropriate for the sensor to operate) with the sports surface in in the second position such that it can collect data from the sports surface.

A sensing assembly according to the present disclosure may comprise one or more of sensing mechanisms as described above and/or disclosed herein. For example, the sensing assembly may have a first portion configured to provide the intrusive sensing component, which may be an "intrusive sensing mechanism". The sensing assembly may have a second portion configured to provide the non-intrusive sensing components, which may be a "non-intrusive sensing mechanism", for example. The intrusive sensing mechanism and the non-intrusive sensing mechanism may each be detachable from the sensing assembly and from each other, and/or may be provided both in combination and separately. In this way, the sensing assembly may include different combinations of intrusive sensing mechanisms and non-intrusive sensing mechanisms, such as two non-intrusive sensing mechanisms arranged either side of an intrusive sensing mechanism, for example. A sensing assembly according to the present disclosure may comprise any combination of intrusive sensing mechanisms and/or non-intrusive sensing mechanisms.

The sensing assembly may itself broadly be considered to be "an apparatus for collecting data", though defining it a "sensing assembly" helps to differentiate the sensing assembly (e.g. in isolation) from "an apparatus" comprising the sensing assembly mounted to an unmanned vehicle, for example.

In addition to real (e.g. natural) surfaces, such as those comprising grass, turf, soil, clay, etc., the sensing assembly/apparatus disclosed herein may also, or alternatively, be used to monitor artificial surfaces, such as artificial grass.

Also disclosed herein is an unmanned vehicle configured (or configurable) for self-propelled movement on a sports surface. The vehicle is preferably an unmanned "ground" vehicle. The vehicle may be configured for mounting a sensing assembly as disclosed herein thereto and/or may have said sensing assembly mounted thereto.

Also disclosed herein is an apparatus, comprising a sensing assembly as described above and/or herein; and an unmanned vehicle configured (or configurable) for self-propelled movement on a sports surface, wherein the sensing assembly is mounted to the vehicle.

The unmanned vehicle may be configured (or configurable) for self-propelled movement through a plurality of waypoints on the sports field or surface, whereby the sensing mechanism can be actuated by the controller (i.e. the controller can control actuation of the sensing mechanism via the actuator) when a waypoint is reached. The controller may further be configured to actuate a mounted sensing mechanism when a waypoint is reached, preferably automatically.

Also disclosed herein is an intrusive sensing mechanism as described above and/or herein.

Also disclosed herein is a non-intrusive sensing mechanism as described above and/or herein.

Also disclosed herein is a method of collecting data from a sports surface, comprising: configuring an unmanned ground vehicle to move around a plurality of waypoints on a sports surface; and collecting, at predetermined waypoints, data from the sports surface, wherein the data is collected by a sensing assembly mounted to the vehicle, the sensing assembly comprising at least one sensing mechanism configured to move a sensing component attached thereto between a first (e.g. "retracted" or "stored") position and a second (e.g. "deployed") position when the vehicle is at a waypoint or a waypoint is reached.

Preferably, the data is collected by a sensing assembly as described above and/or disclosed herein.

As used herein, the term "self-propelled vehicle" preferably connotes a vehicle carrying or containing within itself the means for its own propulsion, for example an unmanned ground vehicle having an electric battery configured to supply power to one or more motors configured to drive the wheels across a surface, such as a sports surface. Such a vehicle may also be referred to as an autonomous vehicle, for example.

As used herein, the terms [sports] "field", "surface" and "ground" may be used interchangeably with similar meanings in the context of the present disclosure.

It will be understood by a skilled person that any apparatus feature described herein may be provided as a method feature, and vice versa. It will also be understood that particular combinations of the various features described and defined in any aspects described herein can be implemented and/or supplied and/or used independently.

Moreover, it will be understood that the present invention is described herein purely by way of example, and modifications of detail can be made within the scope of the invention. Furthermore, as used herein, any "means plus function" features may be expressed alternatively in terms of their corresponding structure.

BRIEF DESCRIPTION OF THE FIGURES

One or more exemplary embodiments will now be described with reference to the accompanying figures, in which.

DETAILED DESCRIPTION

Figure 1:
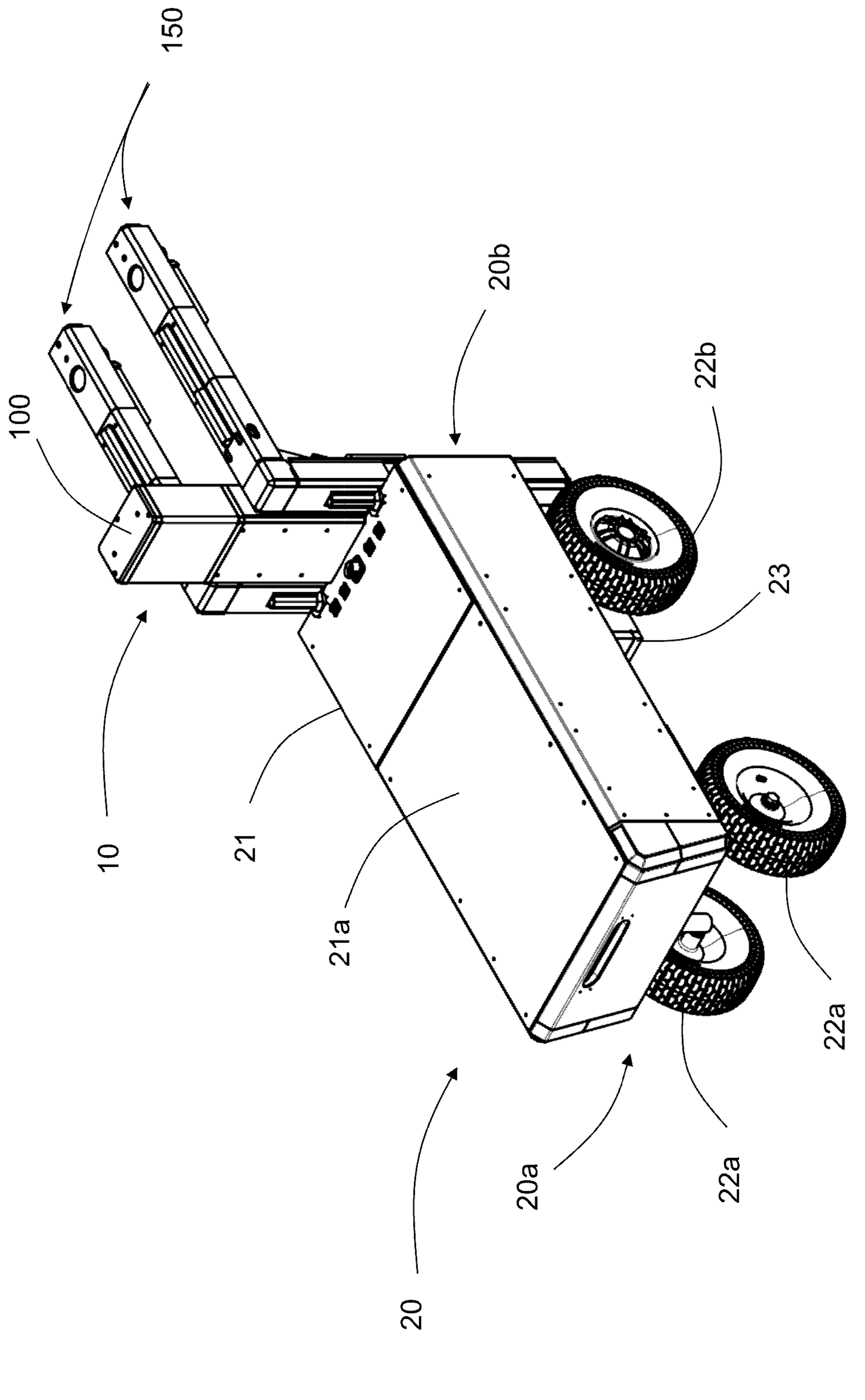
FIG. 1 shows a perspective view of an apparatus comprising an autonomous/unmanned vehicle according to the present invention.
Figure 2:
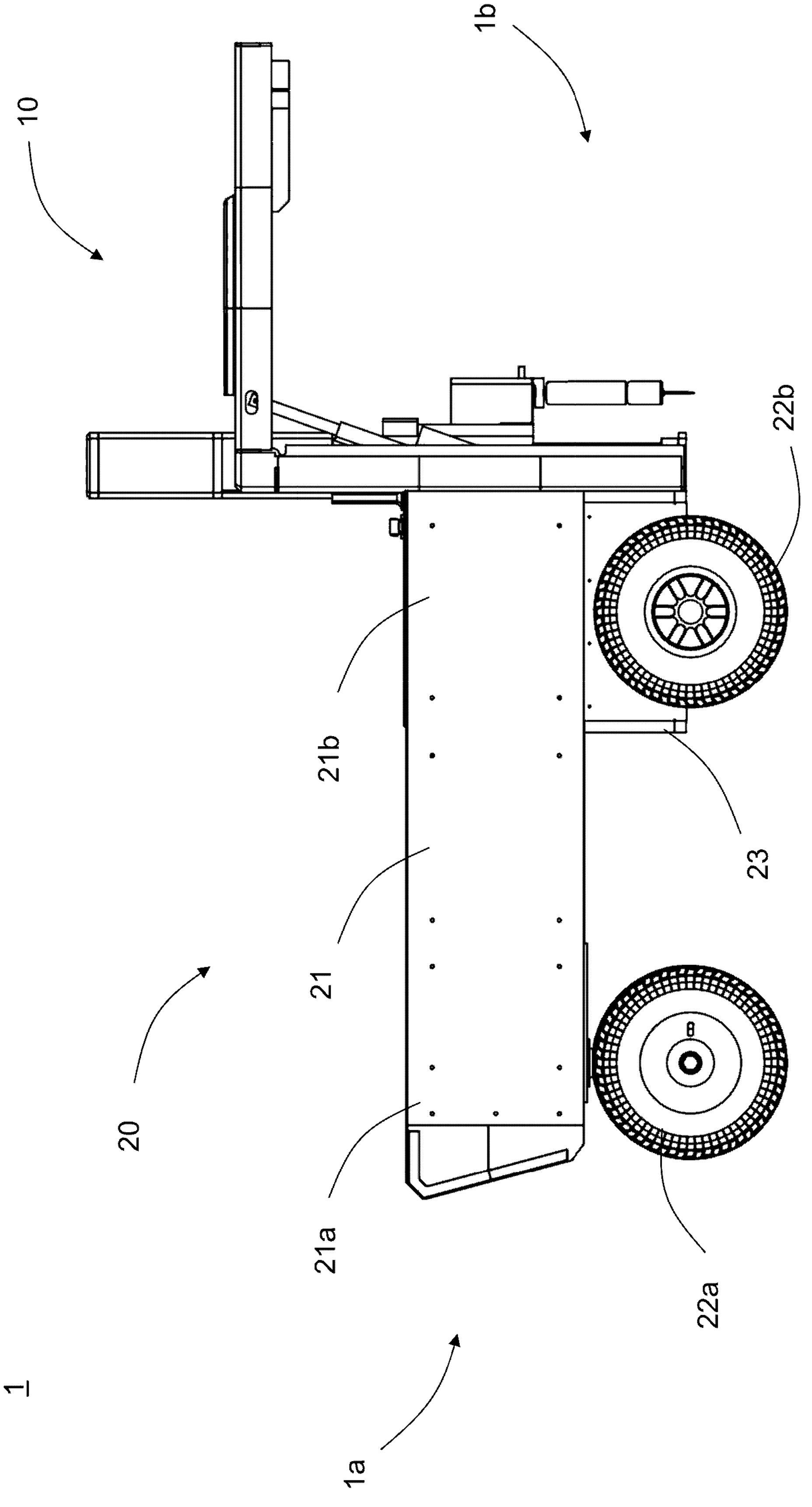
FIG. 2 shows a side view of the apparatus shown in FIG. 1.

FIGS. 1 and 2 depict an apparatus 1 for obtaining performance data from a sports field or surface according to an exemplary embodiment of the present invention. The apparatus 1 in this embodiment comprises a sensing assembly 10 comprising sensing mechanisms 100, 150, which is removably mounted to a vehicle 20. The vehicle 20 is preferably an "unmanned ground vehicle" (or "rover"), which a person skilled in the art will understand to include a vehicle that can be driven remotely or controlled to motivate itself autonomously using a combination of in-vehicle technologies and sensors. This may also be referred to as "self-propelled movement".

In this embodiment, the sensing assembly 10 comprises mechanisms 100, 150. The sensing assembly 10 may be removable from the vehicle 20, so as to allow for replacement and/or maintenance of the sensing assembly 10, sensing mechanisms 100, 150 and the vehicle 20 when required.

The vehicle 20 has a front end 20*a* and a rear end 20*b*. The side of the vehicle 20 visible in FIG. 2 may therefore be referred to herein as the "left" side, and the opposing side of the vehicle 20 not visible in FIG. 2 may therefore be referred to herein as the "right" side.

The vehicle 20 has a body (or "chassis") 21 in the form of a generally rectangular box, attached to which are four wheels 22. The four wheels 22 are divided into two pairs with a first pair of "front" wheels 22*a* mounted underneath the body 21 towards the front end 20*a* of the vehicle 20, and a second pair of "rear" wheels 22*b* (only one shown), which are spaced apart from the front wheels 22*a*, mounted underneath the body 21 towards the rear end 20*b* of the vehicle 20. As can be seen, the wheels 22 are arranged underneath the body 21 such that a wheel 22 is positioned at roughly each corner of the vehicle 20, preferably such that the wheels 22 are generally confined within a perimeter defined by the body 21 to provide a compact arrangement.

Each of the back wheels 22*b* is attached to a drive unit 23, which on this vehicle 20 is located underneath the body 21 between the rear wheels 22*b*. The drive unit 23 could of course be located elsewhere on or in the body 21, in one or more different configurations. The drive unit 23 includes one or more motors (not shown) operable to drive rotation of the rear wheel 22*b* so as to move the vehicle 20 across a sports field or surface. For example, the drive unit 23 may include a single motor arranged to drive both of the rear wheels 22*b* simultaneously, or each rear wheel 22*b* could be driven independently by a separate motor.

The front wheels 22*a* are configured to steer the vehicle 20 as it moves across the sports surface. The front wheels 22*a* may be steered using an actuator (not shown) located within a cavity defined by the body 21. In this embodiment, the front wheels 22*a* are free to rotate. However, the front wheels 22*a* may also be driven, which can be achieved either using a single motor (not shown) to drive both of the front wheels 22*a*, or separate motors for each of the front wheels 22*a*.

The drive unit 23 may include a self-contained power supply (not shown), such as a battery, to provide electrical power to the other components of the vehicle 20. The power unit may of course be located elsewhere on or in the vehicle 20.

A processor (not shown) may be housed within the body 21 of the vehicle 20, underneath a removable access cover 21*a*, together with various other components and electronics required for the apparatus 1 to operate autonomously. Those other components (not shown) may include, for example, a geo-location device such as a GPS Real Time Kinematics (RTK) device configured to provide precise geo-location of the apparatus 1 and a wireless communication unit configured to allow the apparatus 1 to receive instructions and transmit data collected by the sensing mechanisms 100, 150 of the sensing assembly 10.

The wireless communication may be performed using WiFi, 4G, 5G or any suitable wireless communication method or protocol. The apparatus 1 may communicate with a software application ("App") or platform, which may be a cloud based platform. The software platform may allow an operator to monitor multiple vehicles 20 simultaneously and to access data collected from the various sensing mechanisms 100, 150. The apparatus 1 may receive instructions concerning location and/or a list of data to be collected by the sensing mechanisms 100, 150 of the sensing assembly 10.

For example, using the software platform, an operator could control the apparatus 1 to visit a plurality of waypoints (i.e. locations or positions) on the sports field or surface, and to obtain or collect one or more measurements at each waypoint. The vehicle 20 subsequently would move to each waypoint and collect the required measurements autonomously, and then transmit the obtained data back to the software platform via the wireless communication unit. On the software platform, the received data may be accessed by the operator for analysis. Furthermore, the software platform may be configured to analyse the data automatically, diagnose problems with the sports surface, and/or recommend maintenance to the sports surface. The analysis may be performed using "AI" such as machine learning and/or computer vision. An example of a sports surface or field 30 (here, a football pitch) having a plurality of waypoints 32 positioned across its surface, at each of which the sensing arrangement 10 described herein might be used to obtain one or more measurements, is shown schematically in FIG. 3.

Figure 3:
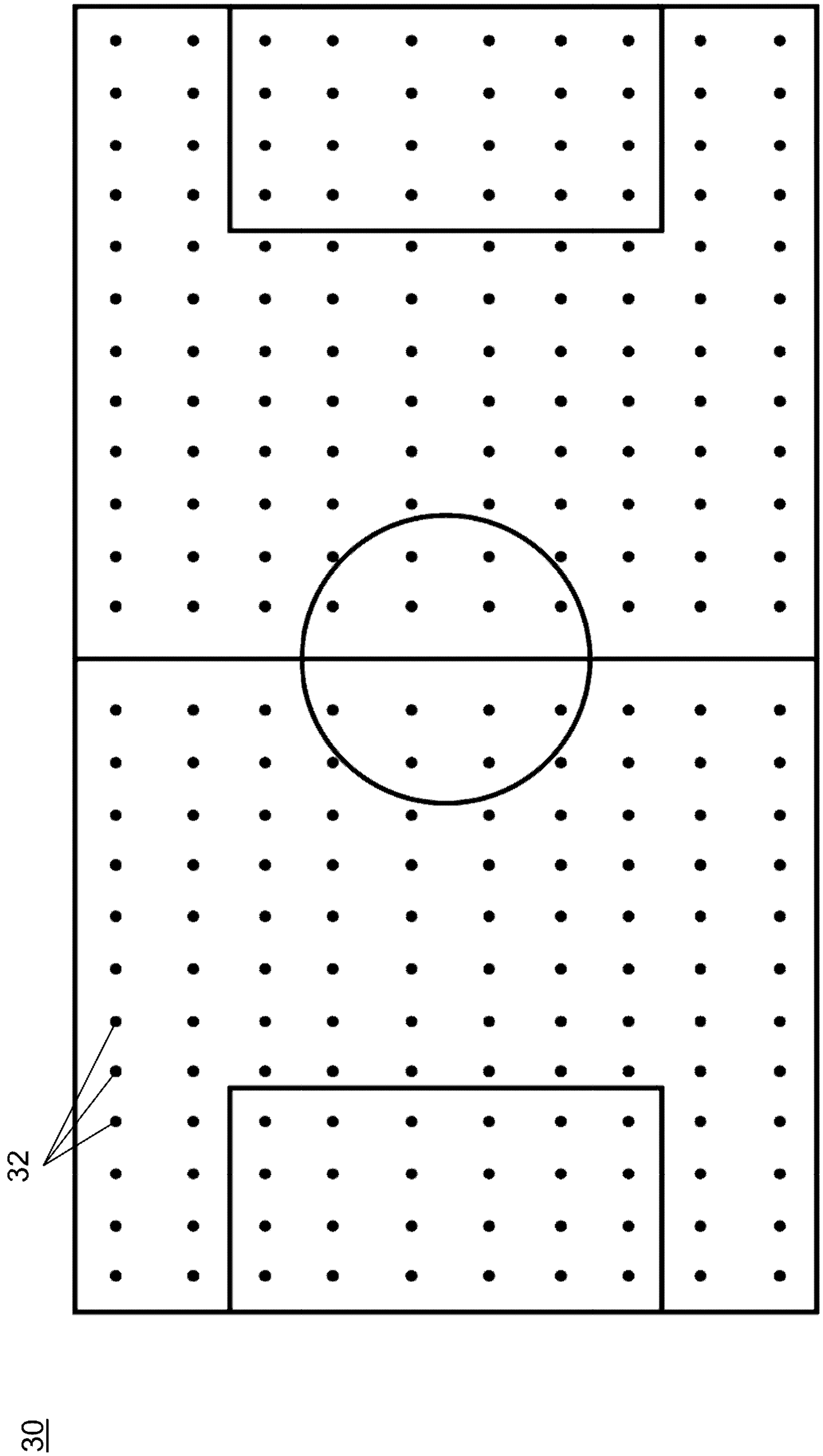
FIG. 3 shows a schematic plan view of a sports field indicating a plurality of waypoints positioned across it.

The waypoints 32 may be positioned in a regular grid as shown in FIG. 3, may be positioned in another regular pattern, or may be randomly distributed across the sports field 30. The waypoints 32 are ideally distributed so as to cover a broad range of locations across the sports field 30 and the density of the waypoints 32 may be substantially uniform across the sports field 30. However, some regions on the sports field 30 may be allocated a higher density of waypoints 32 so as to collect more data in those regions, for example. The path taken by the vehicle 20 between the waypoints 32 may be pre-programmed or may be determined by the software platform or the apparatus 1. The vehicle 20 preferably visits each of the waypoints 32 in such a way as to minimize the distance travelled and/or the time taken to collect the measurements.

Figures 4A, 4B, 4C:
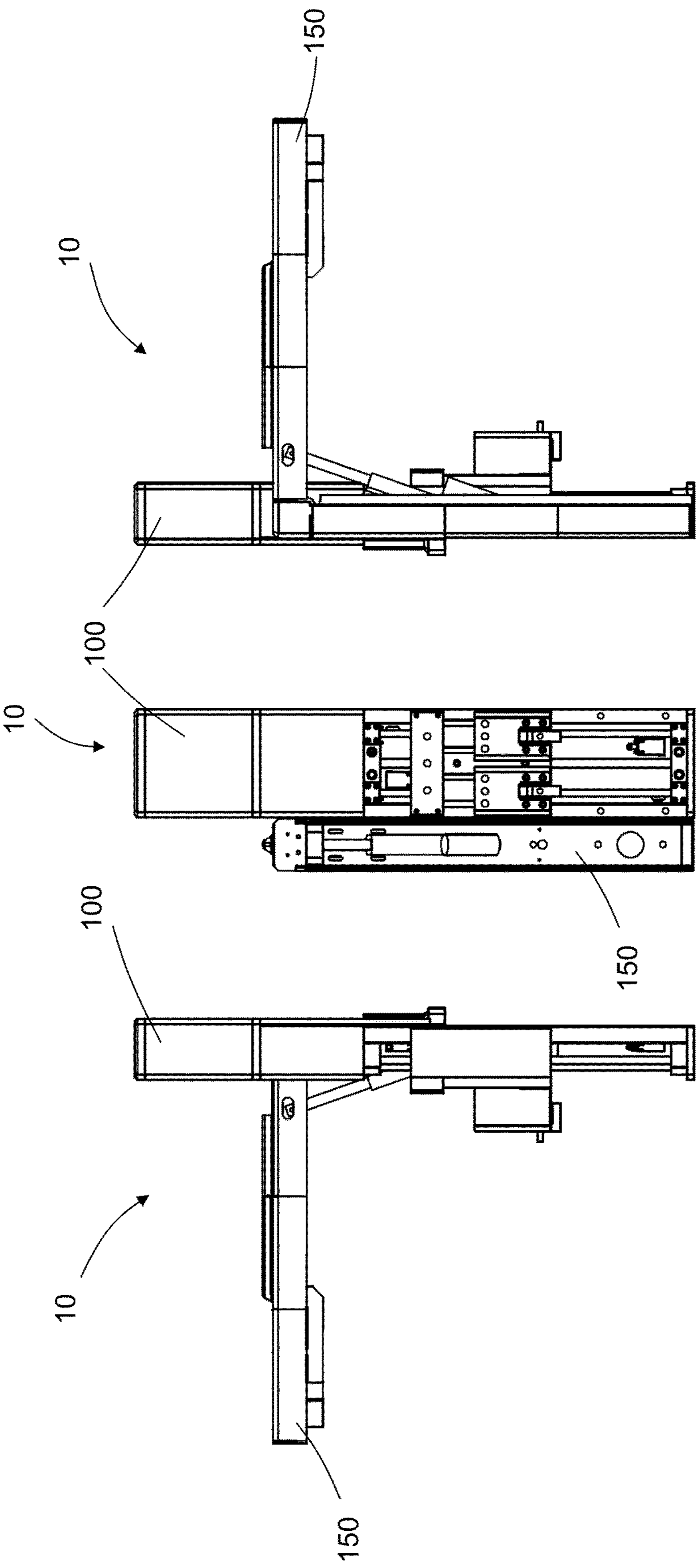
FIGS. 4A to 4C show front and side views of a sensing assembly according to an embodiment of the present invention.

FIGS. 4A to 4C show a sensing assembly 10 comprising both an intrusive sensing mechanism 100 and a non-intrusive sensing mechanism 150 according to an exemplary embodiment. FIG. 4A is a side view of the intrusive sensing mechanism 100 (i.e. it depicts the sensing assembly 10 as viewed from the right side of the vehicle 20, when mounted thereto); FIG. 4B is a rear view of the sensing assembly 10 (i.e. it depicts the sensing assembly 10 as viewed from the front end 20*a* of the vehicle 20, when mounted thereto); and FIG. 4C is a side view of the non-intrusive sensing mechanism 150 (i.e. it depicts the sensing assembly 10 as viewed from the left side of the vehicle, when mounted thereto).

The intrusive sensing mechanism 100 will be described further in relation to FIGS. 6 to 9, and the non-intrusive sensing mechanism 150 will be described further in relation to FIGS. 10 and 11.

Briefly, however, the non-intrusive sensing mechanism 150 in FIGS. 4A to 4C is shown in a deployed (i.e. "second") position in which the non-intrusive sensing mechanism 150 is raised; as will be discussed later, the non-intrusive sensing mechanism 150 can also be moved to a retracted (i.e. "first") position in which the non-intrusive sensing mechanism 150 is lowered.

The intrusive sensing mechanism 100 is configured to have two sensing components (not shown) mounted thereto, which can be moved on the sensing mechanism 100 between a retracted/stored (i.e. "first") position and a deployed (i.e. "second") position. More specifically, the sensing mechanism 100 is designed to have mounted thereto sensor modules (not shown) that comprise the sensing components, as will be discussed further on. The intrusive sensing mechanism 100 is shown in a retracted/stored position for each of the (unmounted) sensing components.

The relative positions of the sensing mechanisms 100, 150 may of course be swapped around without affecting the function of the sensing assembly 10. Furthermore, the number of intrusive and/or non-intrusive sensing mechanisms 100, 150 provided on a sensing assembly 10 may vary, and be placed in any configuration, according to different embodiments of the invention. For example, the apparatus 1 depicted in FIG. 1 has two non-intrusive sensing mechanisms 150, which are arranged one on either side of an intrusive sensing mechanism 100. Alternatively, the apparatus 1 may have only (one or more) intrusive sensing mechanism(s) 100, or only (one or more) non-intrusive sensing mechanism(s) 150 only, for example.

Figure 5B:
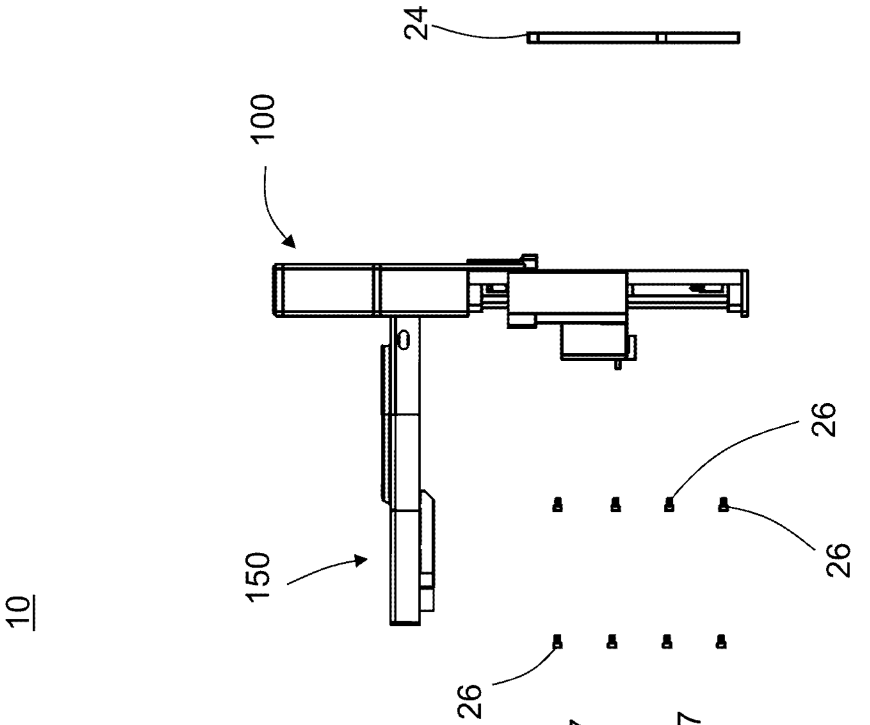
FIGS. 5A and 5B show how the sensing assembly may be connected to the autonomous vehicle.
Figure 5A:
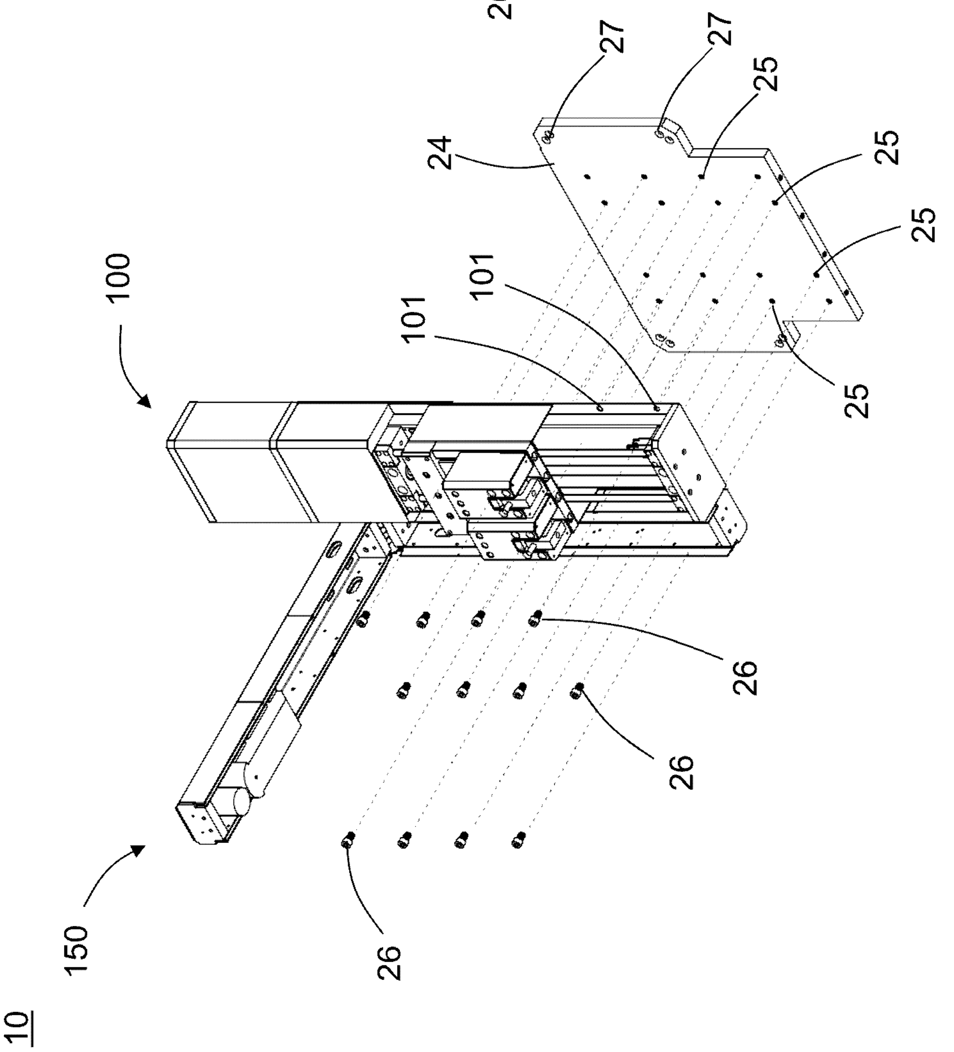

FIGS. 5A and 5B show a back plate 24 which is located at the rear end 21*b* of the vehicle 20. The back plate 24 has a number of mounting holes 25 (only some labelled for clarity). Similarly, the intrusive sensing mechanism 100 has a number of mounting holes 101 (only some labelled), and the non-intrusive sensing mechanism 150 also has a number of mounting holes 161 (not shown).

During assembly of the sensing assembly 10, bolts 26 (only some labelled) are passed through the mounting holes 101, 161 of the sensing mechanisms 100, 150 and into the mounting holes 25 of the back plate 24 thereby attaching the sensing assembly 10 to the back plate 24. In FIG. 5A, dotted lines are used to show where each of the bolts 26 may be located once the sensing assembly 10 is aligned with the back plate 24. Any suitable number of bolts 26 and any suitable number of mounting holes 101, 161 may be used to attach the sensing assembly 10 to the back plate 24. Furthermore, alternative attachment methods, such as screws, hooks, or releasable fasteners may be used instead of or in addition to the bolts 26.

Further fixing holes 27 are provided for attaching the back plate 24 to the vehicle 20 via suitable fixing means. By allowing the sensing assembly 10 to be easily attached and removed from the vehicle 20 in this way, it is possible to repair and replace either the vehicle 20 or the sensing assembly 10 individually. Since different bolts 26 are used for attachment of the intrusive sensing mechanism 100 and the non-intrusive sensing mechanism 150, either of the mechanisms 100, 150 may be removed individually for repair or replacement. Furthermore, the back plate 24 may have a particular configuration to allow the sensing assembly 10 to be mounted to a particular vehicle 20. Different vehicles may have different designs, and therefore a different back plate 24 can be configured for each different vehicle used and secured by fixing means through fixing holes 27, though the pattern of mounting holes 25 on the back plate 24 for securing the sensing assembly 10 will be the same on each different back plate 24. This allows the same sensing assembly 10 to be used with a plurality of different vehicles.

Figure 6C:
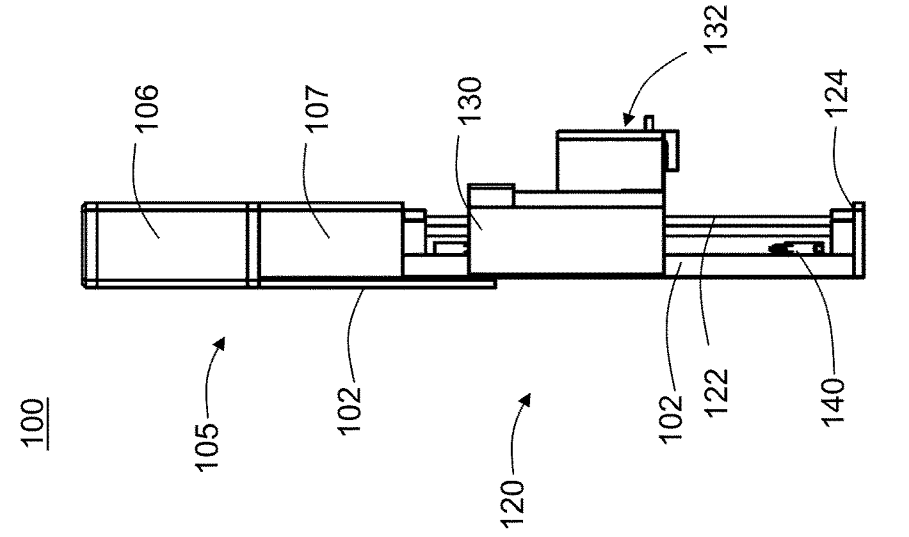
FIGS. 6A to 6F show several different views of an embodiment of an intrusive sensing mechanism forming part of an apparatus according to an embodiment of the present invention.
Figure 6B:
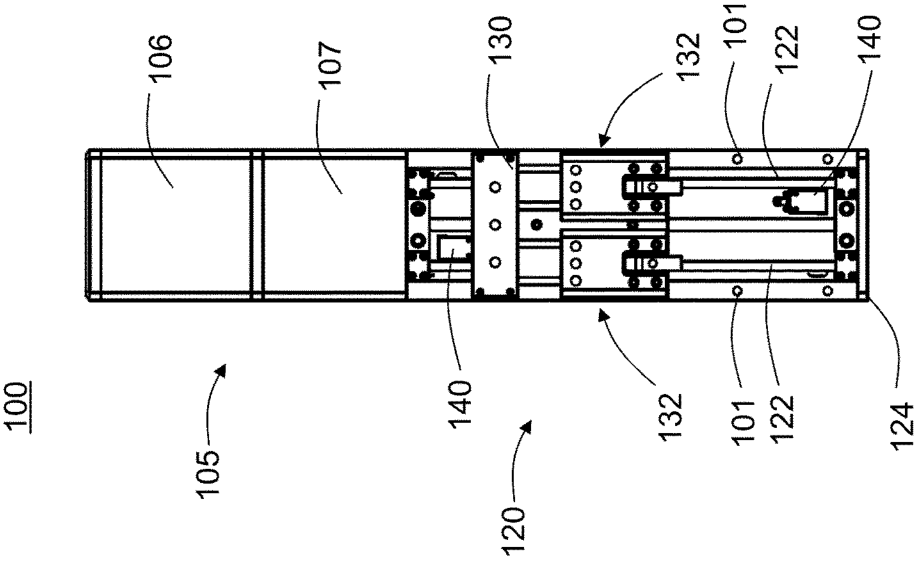
Figure 6A:
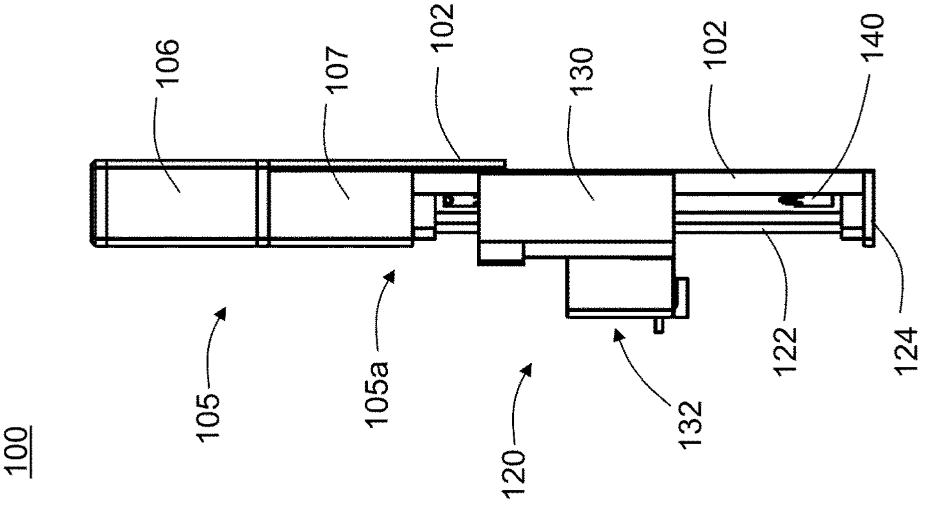
Figure 6G:
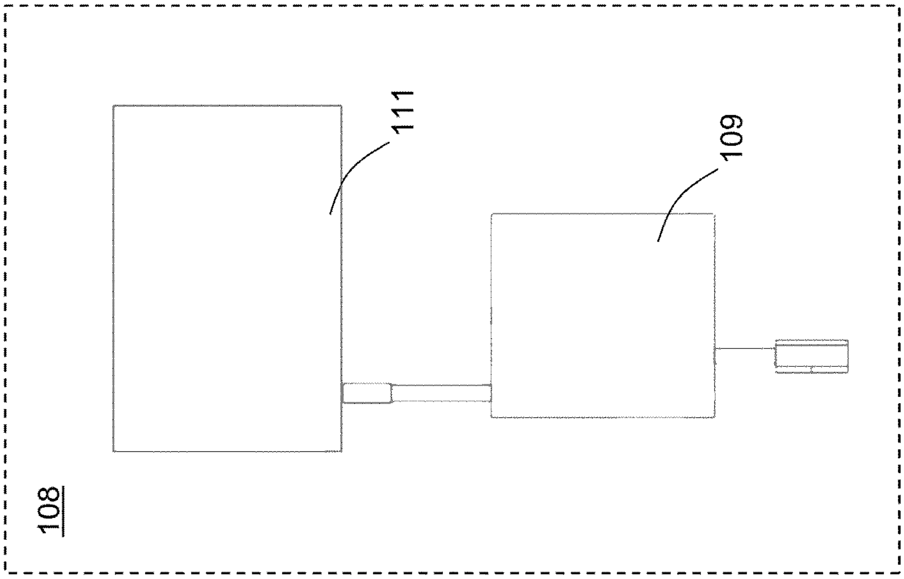
FIG. 6G shows a schematic view illustrating a controller for the sensing mechanism.
Figure 6E:
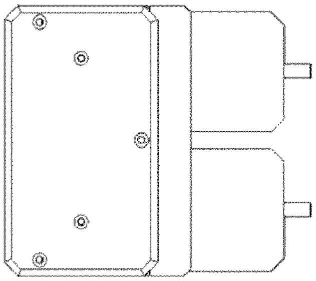
Figure 6F:
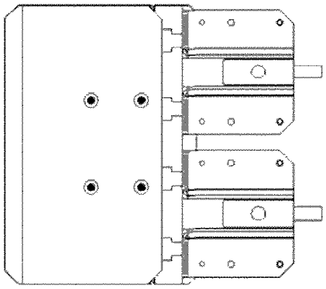
Figure 6D:
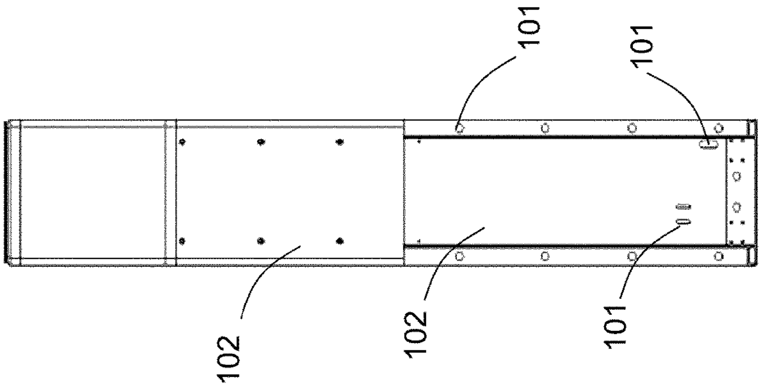

FIGS. 6A to 6F depict side, front and rear views of the intrusive sensing mechanism 100 in isolation according to an exemplary embodiment, including top and bottom views in FIGS. 6E and 6F, respectively. The intrusive sensing mechanism 100 has one or more mounting plates 102 each with mounting holes 101 (only some of which are labelled for clarity purposes) to facilitate attachment of the intrusive sensing mechanism 100 to the back plate 24 of the vehicle 20, or to enable attachment of subcomponents of the intrusive sensing mechanism 100. The intrusive sensing mechanism 100 includes a lowering mechanism 120 and an actuation and control module 105.

The actuation and control module 105 in this embodiment includes a GPS antenna 106, and an actuator housing 107. The actuator housing 107 contains an actuator 110 (not shown) for raising and lowering the lowering mechanism 120. The actuator 110 may be an electric (e.g. brushless DC) motor, as will be described later in relation to FIGS. 8A-8E, or it may be any other means of linear actuator, such as a piston.

A controller 108, schematically illustrated in FIG. 6G, is also provided, which may also be contained within the actuator housing 107, for example. The controller 108 is configured to control actuation of the intrusive sensing mechanism 100 via the actuator 110 when a waypoint is reached.

In the embodiment shown, the actuator 110 is a brushless DC electric motor and the controller 108 comprises a motor control unit 109 for controlling the rotational speed, torque, direction of rotation, and/or position of the electric motor 110 so as to raise and lower the lowering mechanism 120 of the intrusive sensing mechanism 100. The motor control unit 109 may comprise a field-orientated control (FOC) for electric brushless motors, for example.

The controller 108 also comprises a processing/control module 111, which is connected to the motor control unit 109. The processing/control module 111 comprises an electronic board configured for controlling other electronic components of the intrusive sensing mechanism 100. The processing/control module 111 acts as an interface that can convert between the low level communication protocols used by components such as the motor control unit 109 and the wireless communication protocol used to communicate with the software platform. The GPS antenna 106 communicates with the GPS RTK device in the body 21 of the vehicle 20.

Two rails (or "shafts") 122 extend from a lower end 105*a* of the actuation and control module 105 towards a base 124. The lowering mechanism 120 comprises a slider 130 which translates along the rails 122 when actuated by the motor 110 in the actuator housing 107. As depicted, there are two rails 122, but there may be any number of rails 122 suitable to enable translation of the slider 130 between the base 124 and the lower end 105*a* of the control module 105.

An "upper limit" switch 140 is positioned on the mounting plate 102 near the lower end 105*a* of the control module 105, and a "lower limit" switch 140 is positioned on the mounting plate 102 near the base 124. The upper and lower limit switches 140 determine when the slider 130 is close to contacting the base 124 or the control module 105 and prevent further actuation of the actuator 110. The slider 130 is in a fully raised position when the upper limit switch 140 is triggered, and in a fully lowered position when the lower limit switch 140 is triggered. If either of the limit switches 140 are triggered during actuation of the lowering mechanism 120, further actuation is stopped to prevent damage to the intrusive sensing mechanism 100.

Attached to the slider 130 are two sensor modules 132, each configured to attach to a sensor 145 (not shown) for collecting data when in contact with, or inserted into the sports surface. Although two sensor modules 132 are used in this embodiment, the slider 130 may be adapted to carry one or more sensor modules 132. As used herein, the term "sensing component" may be used interchangeably to describe both a sensor 145 (i.e. intrusive or non-intrusive) and a sensor module 132 that may house an intrusive sensor, for example. In other words, the sensing component is what is mounted to the sensing mechanism 100, 150, and thereby moved between the retracted ("first") and deployed ("second") positions.

Figure 7B:
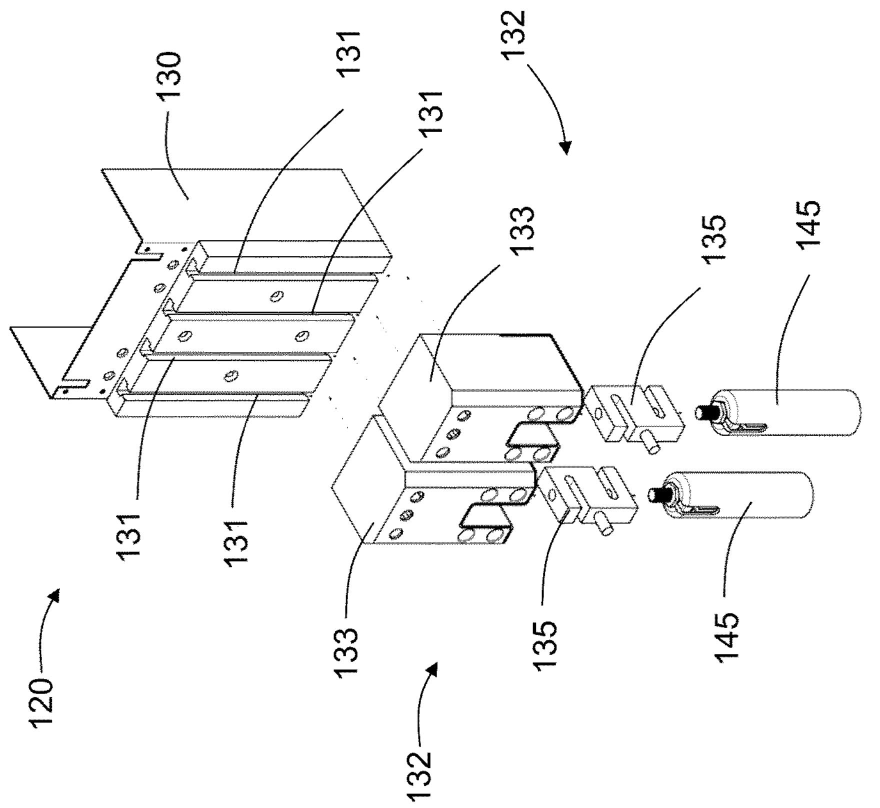
FIGS. 7A and 7B show a perspective view and an exploded view, respectively, of the intrusive sensing mechanism of FIGS. 6A to 6F.
Figure 7A:
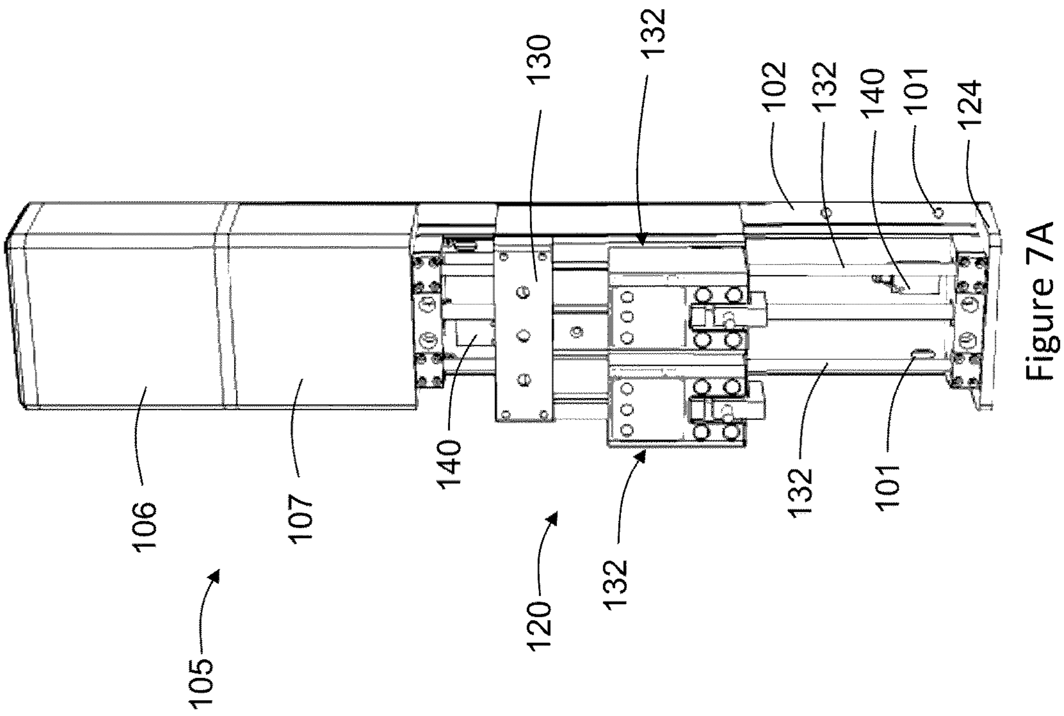

With reference to FIGS. 7A and 7B, each sensor module 132 comprises a sensor housing 133 attached to the sensor 145 via a respective load cell 135. Each sensor module 132 also comprises a dedicated circuit board (not shown) for the particular sensor 145 housed in the sensor housing 133. In order to attach each sensor housing 133 to the slider 130, each sensor housing 133 in this embodiment has two protrusions (not shown) configured to fit slidably within a corresponding pair of slots 131 on the slider 130. The load cell 135 measures the force being applied to the sensor 145 in reaction to it being inserted into the sports surface as the slider 130 is lowered by the actuator 110. If this measured force is outside of a predetermined range, the controller will stop the actuator 110 lowering the slider 130, and will instead return the slider 130 to its fully raised position. Furthermore, the force measured by the load cell 135 may be recorded to provide additional data on a sports surface.

The sensor 145 may be any kind of sensor that collects data when in contact with or inserted into a sports surface. For example, the sensor 145 may measure soil moisture, soil temperature, canopy temperature, soil pH, soil salinity levels, soil composition, surface traction, soil shear stress, and/or NPK values. Different sensors 145 may be attached to each of the sensor housings 133 so as to provide measurement of different parameters. Alternatively, the same type of sensor 145 may be attached to each of the sensor housings 133. When removing or replacing sensors 145 from the intrusive sensing mechanism 100, the whole sensor module 132 (i.e. including the sensor 145, load cell 135 and sensor housing 133) is removed or replaced.

Figure 8E:
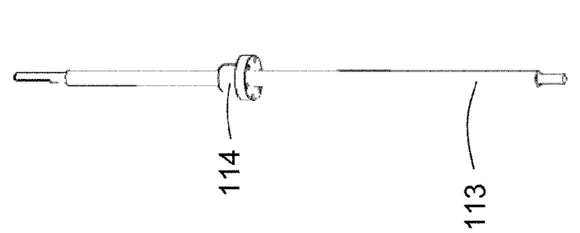
FIGS. 8A to 8E show cutaway views of the intrusive sensing mechanism of FIGS. 6 and 7, exposing the internal components.
Figure 8D:
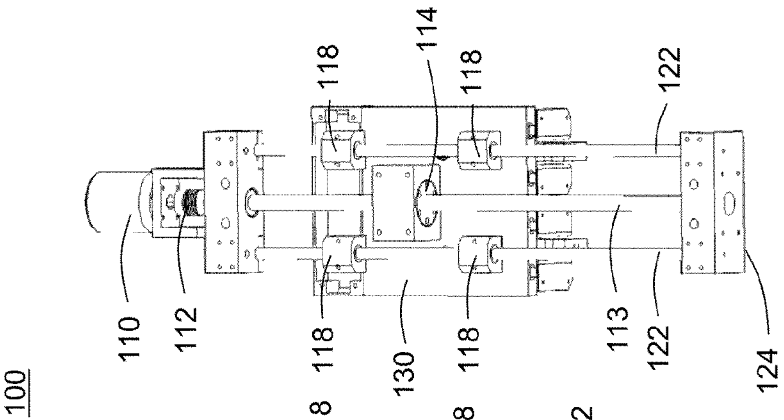
Figure 8C:
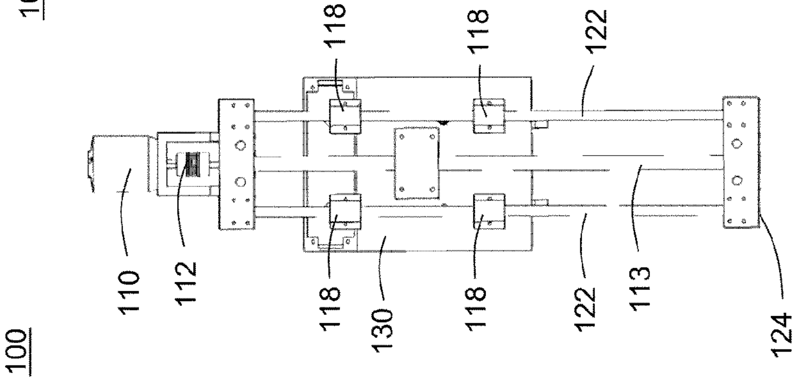
Figure 8B:
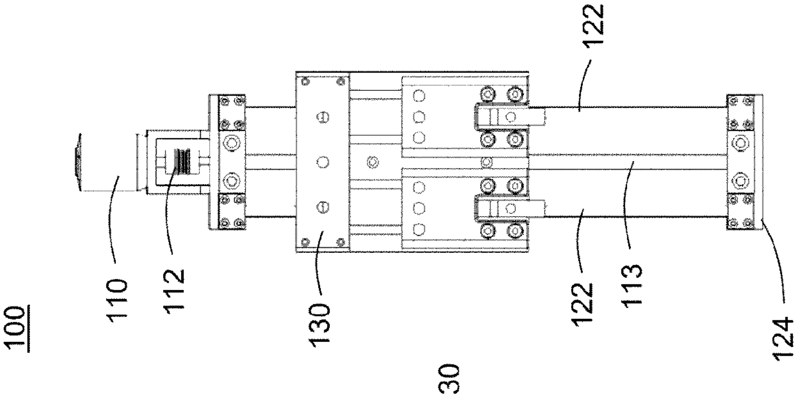
Figure 8A:
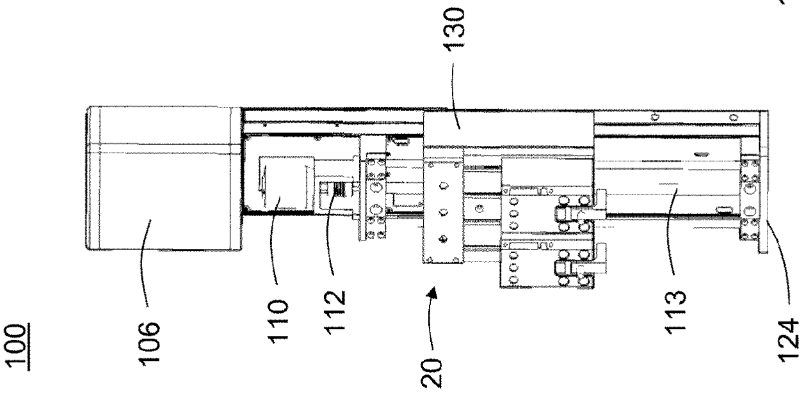

Actuation of the lowering mechanism 120 will now be described in relation to FIGS. 8A to 8E. FIG. 8A depicts a view of the intrusive sensing mechanism 100, with the actuator housing 107 removed to show the internal components. FIGS. 8B to 8D show further views of the intrusive mechanism 100 where other components (such as the mounting plates 102 and the GPS antenna 106) have been removed for ease of understanding. Each of the rails 122 extends through a pair of brackets 118 that are attached to the slider 130 in order to constrain movement of the lowering mechanism 120 to a linear axis.

The actuator housing 107 in this embodiment contains an actuator 110 in the form of a motor, such as a brushless DC motor, and a coupling 112. The coupling 112 transmits drive rotation of the motor 110 into driven rotation of a rod 113, which extends from the coupling 112 to the base 124. As can be seen in FIG. 8E, the rod 113 has external threading configured to engage with internal threading of a collar 114. The collar 114 is attached to the slider 130 so that rotation of the rod 113 causes linear motion of the collar 114 and the slider 130 along the rod 113. The motor 110 is controlled by the controller 108 in the actuation and control module 105, which controls the speed and direction of the motor 110. The slider 130, and any sensor modules 132 attached thereto, can thereby be both be raised and lowered at a predetermined speed.

Furthermore, the controller 108 (in the actuation and control module 105) includes a positioning sensor arrangement (not shown). For example, the controller 108 may be further configured to determine the first and second positions of a sensing component on the intrusive sensing mechanism 100 according to the type of sensing component mounted thereto. In this way, actuation of the sensing mechanism can be controlled such that it correctly positions the sensing component relative to the sports surface for collecting data in its second "deployed" position.

In one exemplary embodiment, this positioning sensor arrangement comprises an encoder arranged to measure the angle of rotation of the motor 110. The rotation angle of the motor 110 at which the lowering mechanism 120 triggers the upper and lower limit switches 140 is stored by the controller 108. These angles may be determined during assembly of the intrusive sensing mechanism 100, or may be updated subsequently during maintenance of the autonomous apparatus 1. The difference in rotation angle, and the predetermined separation of the upper and lower limit switches 140 provide a calibration to convert rotation angle of the motor 110 to a linear distance moved by the lowering mechanism 120. This calibration may be used by the controller 108 during use of the intrusive sensing mechanism 100 to move the lowering mechanism 120 to any specific location between the fully raised and fully lowered positions.

Figure 9A:
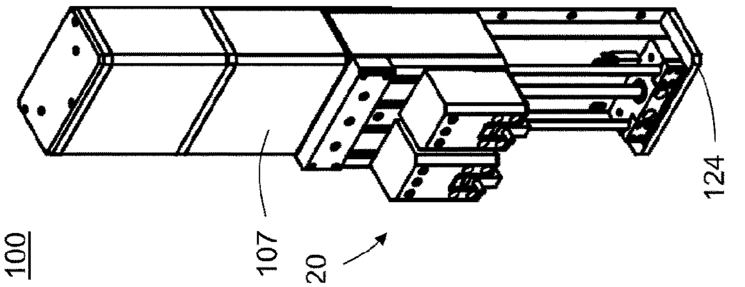
FIGS. 9A to 9E are a sequence of perspective views of the intrusive sensing mechanism to illustrate its movement during operation.

Operation of the lowering mechanism 120 for taking a measurement at a waypoint on a sports surface will now be described in relation to FIGS. 9A to 9E. FIG. 9A depicts the lowering mechanism 120 in a first "retracted" position. When the apparatus 1 is driving across the sports surface, the lowering mechanism 120 will remain in the first position so as to prevent any contact between the sensors 145 and the sports surface. Furthermore, when in the first position, the sensors 145 can easily be removed and replaced from the sensor housings 133 by an operator. This may be for repair and replacement of a sensor 145, or to switch to a different type of sensor 145 so as to measure a different parameter of the sports surface. As mentioned above, to replace or exchange a sensor 145 for a different sensor 145, the whole sensor module housing 132 is removed. Each sensor 145 has its own dedicated circuit board (not shown). However, if a sensor 145 is to be repaired or exchanged for the same type of sensor 145, then it is possible to remove only the sensor 145 from the sensor housing module 132, thereby leaving the sensor housing module 132 assembled. The first ("retracted") position is preferably the fully raised position where it is adjacent the control module 105, but may be any other suitable position for preventing contact between the sensors 145 and the sports surface. For example, when the first position is not fully raised, the time taken to move the lowering mechanism 120 to a lower position will be reduced, thereby saving time and reducing both the wear and the energy required by the motor 110.

Figure 9B:
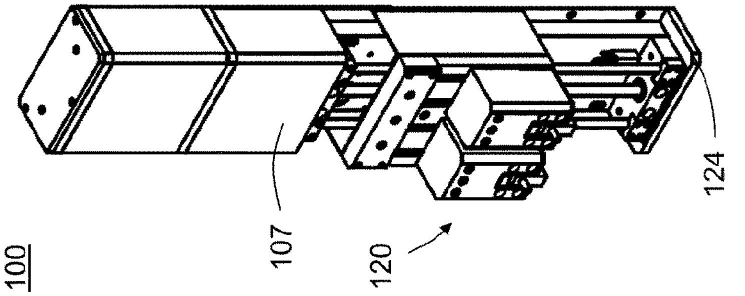
Figure 9C:
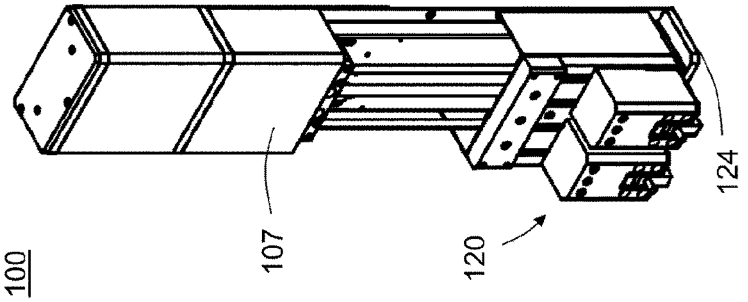

When a measurement is to be taken, the apparatus 1 is stopped at a waypoint. Subsequently, the lowering mechanism 120 is lowered using the motor 110 in the actuator housing 107, as shown in FIG. 9B. The motor 110 may be controlled by the controller 108 to lower the lowering mechanism 120 at a specific speed and/or to lower the lowering mechanism 120 a particular distance over a particular time. These variables may depend on the type of sensor 145 and/or the soil. The actuation speed may be constant or may vary over the range of actuation.

After actuation of the lowering mechanism 120, it will reach a second position where it has been lowered towards the base 124, as shown in FIG. 8C. In the second ("deployed") position, the sensor 145 is in contact with, or inserted into the sports surface. The positioning sensor arrangement allows the exact position of the lowering mechanism 120 to be determined so that the sensor 145 may be lowered to a predetermined depth. This means that the depth reached by the sensor 145 does not depend on the hardness of the soil or on other factors such as the weight of the sensor 145. The optimal predetermined depth of the sensor 145 into the sports surface depends on the type of sensor 145 being used. For example a soil temperature sensor may typically be inserted between 0-15 cm into the soil, whereas a canopy temperature sensor may only be lowered so as to only touch the sports surface. Therefore, the second position of the lowering mechanism 120 is not equivalent to the fully lowered position of the lowering mechanism 120; most sensors 145 require the lowering mechanism 120 to remain at a second position somewhere between the fully raised and fully lowered positions. The lowering mechanism 120 remains in the second position for a predetermined period of time in order for the sensor 145 to collect data on the sports surface at the waypoint. This predetermined period of time may depend on the type of sensor 145 being used.

Figure 9D:
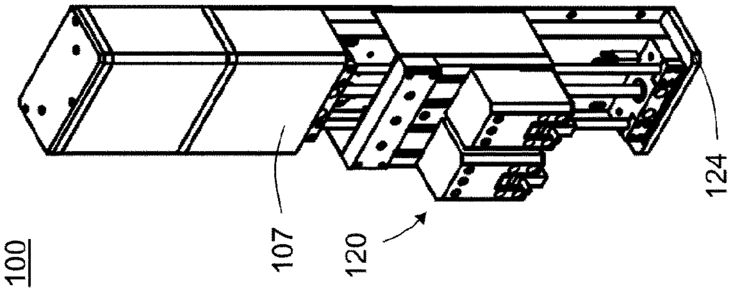

Once the predetermined period of time has elapsed, the lowering mechanism 120 is raised using the motor 110 in the actuator housing 107, as shown in FIG. 9D. The motor 110 may be controlled by the controller 108 to raise the lowering mechanism 120 at a specific speed and/or to raise the lowering mechanism 120 a particular distance of a particular time. These variables may depend on the type of sensor 145 and/or the soil. The actuation speed may be constant or may vary over the range of actuation. The actuation speed during the raising of the lowering mechanism 120 may be the same as the actuation speed during the lowering of the lowering mechanism 120, or the speeds may be different.

Figure 9E:
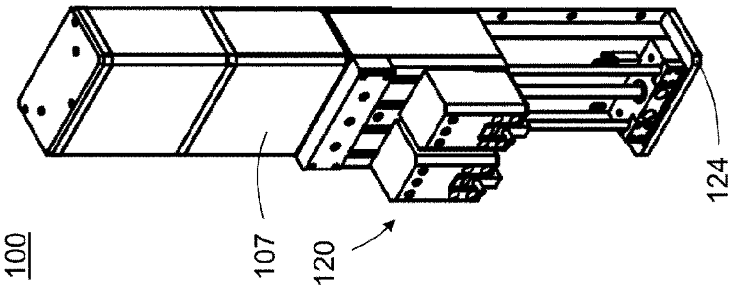

As shown in FIG. 9E, after actuation of the lowering mechanism 120, it will have returned to the first position. Once in its first position, the vehicle 20 may drive to another position on the sports surface in order to collect subsequent measurements by repeating the process.

Figure 10B:
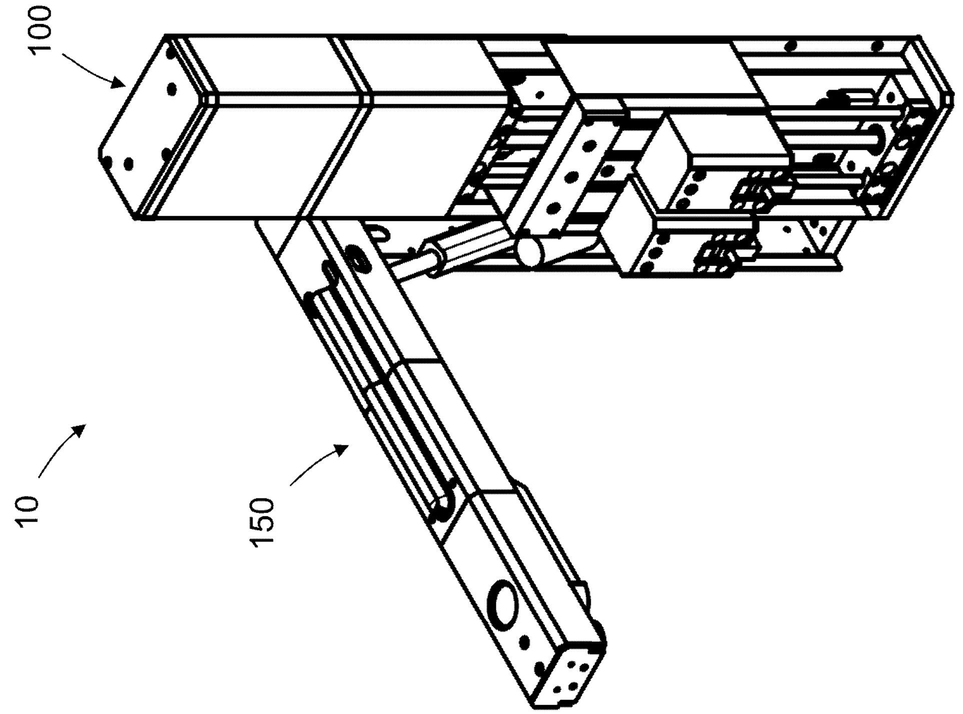
FIGS. 10A and 10B show a non-intrusive sensing mechanism forming part of the apparatus according to an embodiment in a retracted position and a deployed position, respectively.
Figure 10A:
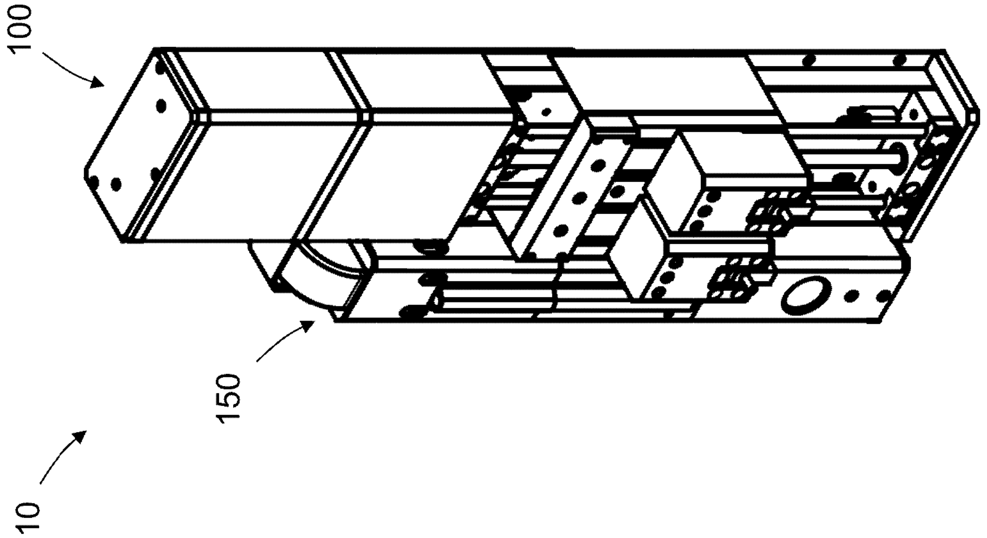
Figure 11C:
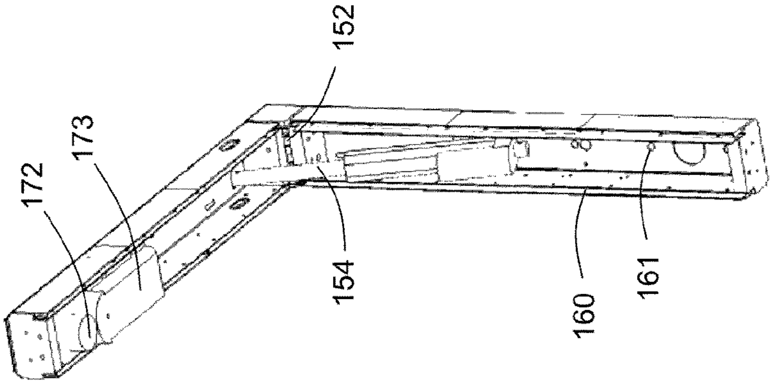
FIGS. 11A to 11D show several different views of the non-intrusive sensing mechanism of FIGS. 10A and 10B in the deployed position.
Figure 11D:
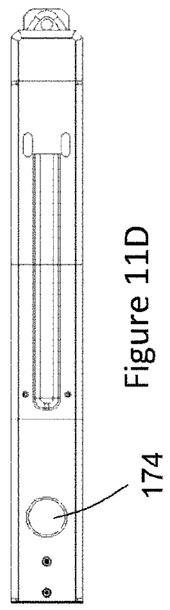
Figure 11B:
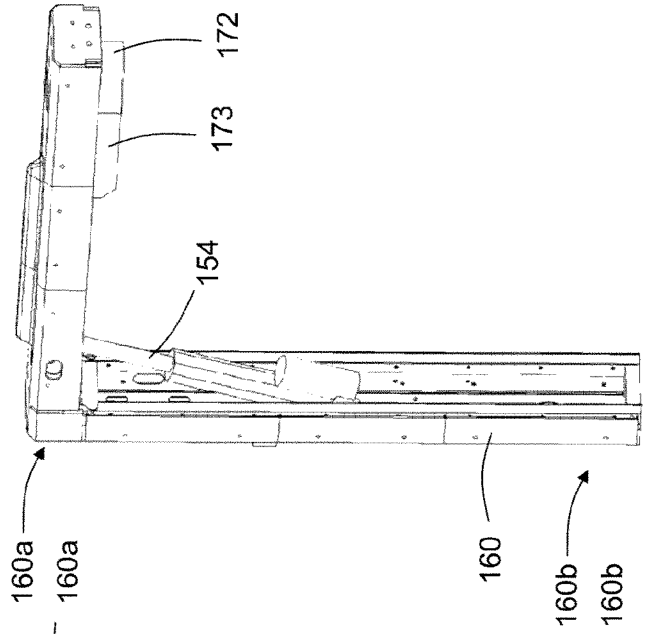
Figure 11A:
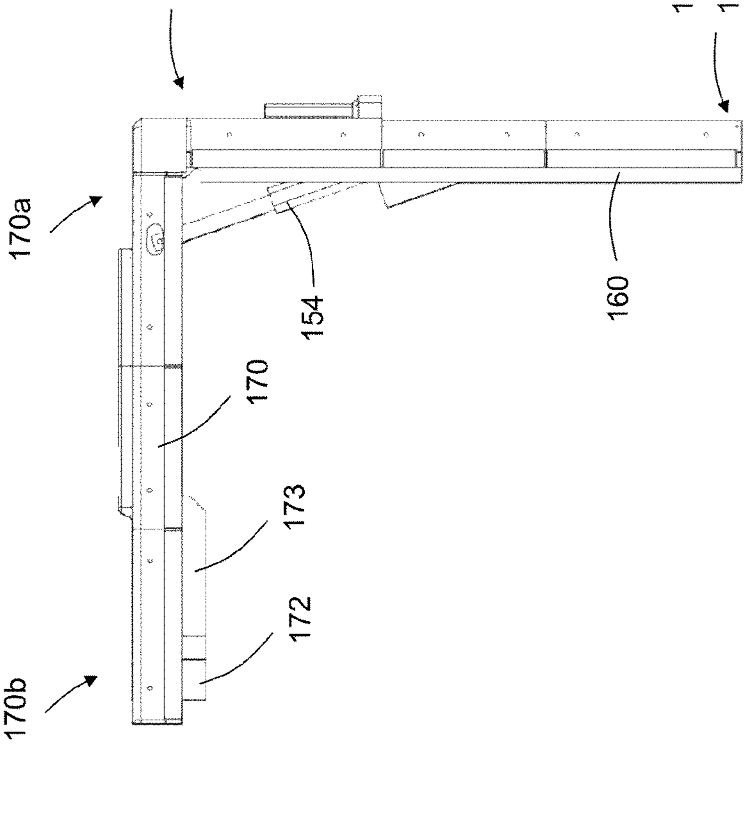

FIGS. 10A and 10B depict the sensing assembly 10 having both an intrusive sensing mechanism 100 and a non-intrusive sensing mechanism 150 (described further below). The non-intrusive sensing mechanism 150 is shown in the retracted (i.e. "first") position in FIG. 10A, and shown in the deployed (i.e. "second") position in FIG. 10B. The non-intrusive sensing mechanism 150 collects data on the sports surface when it is in the deployed position. This may be when the vehicle 20 is stationary or when the vehicle 20 is driving across the sports surface. For example, the non-intrusive sensing mechanism 150 may move to the deployed position when the vehicle 20 reaches a first waypoint on the sports surface, and will remain in the deployed position until the apparatus 1 has collected data from a final waypoint on the sports surface. Thereafter, the non-intrusive sensing mechanism 150 is returned to the retracted position, and will remain in the retracted position when the apparatus 1 is not collecting data, such as when the vehicle 20 is driving outside the sports surface or is in storage.

FIGS. 11A to 11D depict several views of the non-intrusive sensing mechanism 150 in the deployed position to show its various components. The non-intrusive sensing mechanism 150 has a housing 160 with an upper end 160*a* and a lower end 160*b*. The housing 160 has mounting holes 161 (only some are shown for clarity purposes) to facilitate attachment of the non-intrusive sensing mechanism 150 to the back plate 24 of the vehicle 20, or to facilitate attachment to other sub-components of the non-intrusive sensing mechanism 150. The non-intrusive sensing mechanism 150 also includes an arm 170 with a proximal end 170*a* and a distal end 170*b*. The proximal end 170*a* of the arm 170 is pivotally attached to the upper end 160*a* of the housing 160 with a hinge 152, such that the arm 170 may pivot between the deployed position (where the arm 170 is parallel to the sports surface) and the retracted position (where the arm 170 is perpendicular to the sports surface). In order to move the arm 170 between the deployed and retracted positions, an actuator 154 is connected between the housing 160 and the arm 170. The actuator in this embodiment is an electrically powered piston 154, which may be controlled by a controller (not shown). Similar to the controller 108 of the intrusive sensing mechanism, here the controller may also include a positioning sensor arrangement (not shown) to precisely measure the position of the arm 170 relative to the housing 160. This ensures that the arm 170 is fully deployed parallel to the sports surface when taking measurements and that the arm 170 is fully retracted perpendicular to the sports surface when not taking measurements.

The arm 170 has a first optical sensor 172 located in a sensor housing 173 disposed on a lower surface of the arm 170, thereby allowing the first optical sensor 172 to measure the sports surface when the arm 170 is in the deployed position. The first optical sensor 172 may include a combination of various optical instruments, which may include an RGB camera, an infrared and/or near-infrared camera, and/or any other optical instrument such as a multi-spectral or hyper-spectral camera. Data collected using the first optical sensor 172 may be used to record parameters such as: normalised difference vegetation index (NDVI), RGB and near infra-red pictures, turf colour variation, blade density, grass height, grass species and weeds, and/or lawn diseases. When the arm 170 is in the retracted position, the first optical sensor 172 abuts against the housing 170 (see FIG. 10A), thereby protecting the first optical sensor 172 from damage when the vehicle 20 is driving on or outside the sports surface or when the apparatus 1 is in storage.

In this embodiment, a second optical sensor 174 is also provided on an opposite surface of the arm 160 to the first optical sensor 172. This allows the second optical sensor 174 to detect obstacles when the arm 170 is in the retracted position. The second optical sensor 174 may include the same combination of optical instruments as the first optical sensor 172, or may include a different combination. If the second optical sensor 174 detects the presence of an obstacle in front of the arm 170 in the retracted position, the controller will not trigger the piston to move the arm 170 into the deployed position.

Both the intrusive sensing mechanism 100 and the non-intrusive sensing mechanism 150 may be equipped with at least one proximity sensor (not shown) to detect the presence of obstacles near the respective mechanism 100, 150. These obstacles may include people, animals, or other vehicles present on the sports surface. The proximity sensor(s) may comprise an ultrasonic sensor, a LIDAR sensor, and/or a depth camera, either alone or in any combination. The proximity sensor(s) may be placed anywhere on the apparatus 1 suitable for detection of obstacles. For example, the proximity sensor(s) may be placed on any surface of the vehicle 20 or the sensing assembly 10. This includes an external surface of the vehicle 20 such as the corners, sides or surfaces that are parallel to the ground. Depending on the location of the obstacle measured by the proximity sensor(s), the sensing mechanisms 100, 150 have three modes of operation. The intrusive mechanism and non-intrusive mechanisms may use the same proximity sensor(s), or they may each use separate or different proximity sensor(s).

Figure 12:
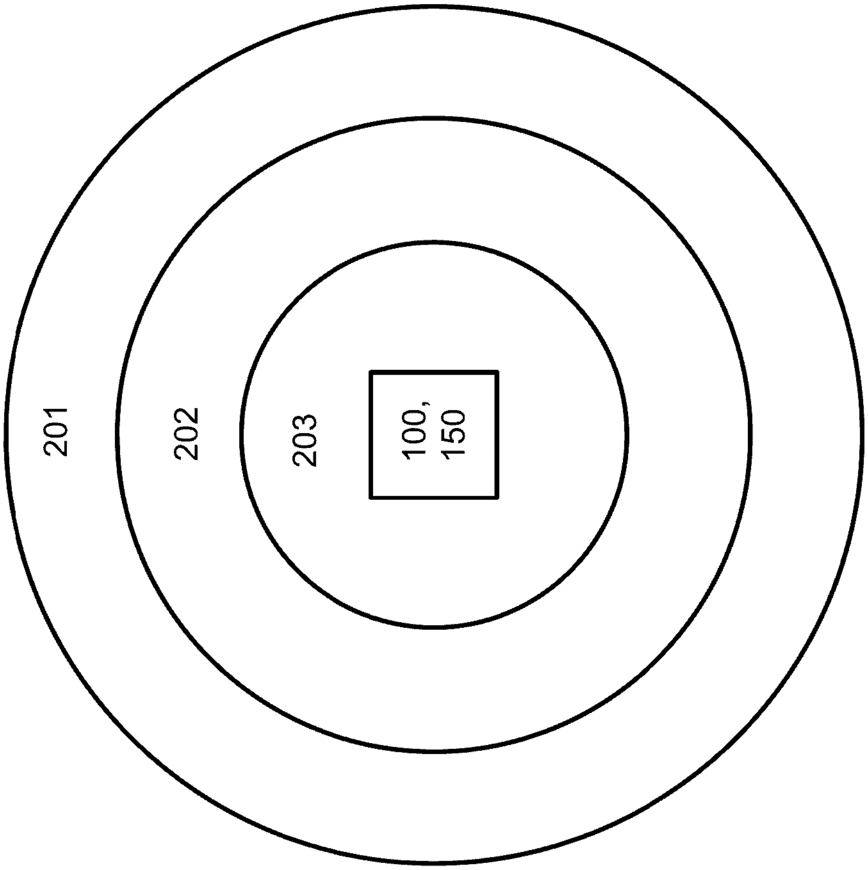
FIG. 12 shows a diagram illustrating different safety zones surrounding an apparatus according to the present invention.

Referring now to FIG. 12, if there is no obstacle detected, or an obstacle is only detected within a first "safe" zone 201, then no action is taken, and the sensing mechanisms 100, 150 both operate as previously described. If an obstacle is detected within a second "warning" zone 202, the sensing mechanisms 100, 150 still operate as previously described, but warning lights and/or a sonic warning device located on the apparatus 1 may be activated to provide a visual and/or audible warning. If an obstacle is detected within a third "danger" zone 203, then the sensing mechanisms 100, 150 stop, the warning lights may be activated (for example to flash or show a different colour) and/or the output, tone or frequency of the sonic warning device may be increased. If the obstacle is subsequently removed from the third area 203, then the mechanisms 100, 150 may restart operation.

It will be appreciated that components such as the controller and processor may be located anywhere within the apparatus 1. While the foregoing has described the intrusive sensing mechanism 100 as having a separate controller to the non-intrusive sensing mechanism 150, a single controller may be used to operate both sensing mechanisms 100, 150. The controller may equivalently be located elsewhere in the apparatus 1, such as within the body 21 of the vehicle 20.

While the forgoing is directed to exemplary embodiments of the present invention, it will be understood that the present invention is described herein purely by way of example, and modification of detail can be made within the scope of the invention. Furthermore, one skilled in the art will understand that the present invention may not be limited to the embodiments disclosed herein, or to any details shown in the accompanying figures that are not described in detail herein or defined in the claims. Indeed, such superfluous features may be removed from the figures without prejudice to the present invention.

Moreover, other and further embodiments of the invention will be apparent to those skilled in the art from consideration of the specification, and may be devised without departing from the basic scope thereof, which is determined by the claims that follow.

The invention claimed is:

1. An apparatus for collecting data from a sports surface, comprising an unmanned ground vehicle configured for self-propelled movement through a plurality of waypoints on the sports surface;

a sensing assembly mounted to the vehicle, comprising:

a sensing mechanism arranged to have mounted thereto at least one sensing component for collecting data from the sports surface, the sensing mechanism being configured to move the sensing component between a first position, in which said sensing component is retracted, and a second position, in which said sensing component is deployed;

an actuator configured to actuate the sensing mechanism to move said sensing component between the first and second positions; and a controller configured to control actuation of the sensing mechanism via the actuator, wherein the controller is configured to actuate the sensing mechanism when the unmanned ground vehicle reaches each of a plurality of predetermined waypoints.

2. The apparatus of claim 1, wherein the controller is further configured to determine the first and second positions of a sensing component on the sensing mechanism according to the type of sensing component mounted thereto, thereby to control actuation of the sensing mechanism such that said sensing component is correctly positioned, relative to the sports surface, for collecting data when in the second position.

3. The apparatus of claim 2, wherein the sensing component is configured for insertion to a predetermined depth into the sports surface and the controller is configured to determine said first and second positions such that said sensing component is inserted to said predetermined depth into the sports surface when in the second position.

4. The apparatus of claim 1, further comprising a proximity sensor configured to detect the presence of objects around the sensing mechanism, wherein the controller is further configured to pause or inhibit actuation of the sensing mechanism when objects are detected within a predetermined distance.

5. The apparatus of claim 4, wherein the proximity sensor comprises at least one of: an ultrasonic sensor, a LIDAR sensor and a depth camera.

6. The apparatus of claim 1, wherein the assembly is configured to operate autonomously.

7. The apparatus of claim 1, wherein the sensing mechanism comprises a slotted arrangement for mounting a sensing component adapted to be mounted thereto.

8. The apparatus of claim 1, wherein the sensing component is a sensor module comprising a housing configured to house a removable sensor.

9. The apparatus of claim 1, wherein the sensing mechanism is configured to have mounted thereto a plurality of sensing components, and wherein the sensing mechanism is further configured to move a mounted sensing component between first and second positions for individual sensing components of said plurality of sensing components.

10. The apparatus of claim 1, wherein the sensing mechanism is arranged to have mounted thereto an intrusive sensing component configured to collect data via contact with the sports surface.

11. The apparatus of claim 10, wherein the sensing mechanism is configured to move said one or more sensing components linearly between the first and second positions, preferably in a direction that is substantially perpendicular to the sports surface.

12. The apparatus of claim 11, wherein the sensing mechanism comprises one or more shafts along which said sensing component is moved between the first and second positions.

13. The apparatus of claim 12, further comprising one or more sensors for determining the position of the sensing mechanism along the one or more shafts, the one or more sensors being configured to feedback the position of the sensing mechanism to the controller.

14. The apparatus of claim 1, wherein the sensing mechanism is configured to have mounted thereto non-intrusive sensing components that are configured to collect data via non-contact with the sports surface.

15. The apparatus of claim 14, wherein the sensing component is an optical sensor and the sensing mechanism comprises a hinged arm on which the optical sensor is mounted, wherein the optical sensor is concealed in the first position, and the optical sensor is aligned with the sports surface in in the second position such that it can collect data from the sports surface.

16. A method of collecting data from a sports surface, comprising:

moving an unmanned ground vehicle through a plurality of waypoints on a sports surface, said vehicle being configured for self-propelled movement; and collecting, at predetermined waypoints, data from the sports surface, wherein the data is collected by a sensing assembly mounted to the vehicle, the sensing assembly comprising at least one sensing mechanism configured to move a sensing component attached thereto between a first position and a second position when the vehicle is at each of the predetermined waypoints, wherein the sensing component is retracted in the first position and deployed in the second position.

17. An apparatus for collecting data from a sports surface, comprising an unmanned ground vehicle configured for self-propelled movement through a plurality of waypoints on the sports surface;

a sensing assembly mounted to the vehicle, comprising:

a sensing mechanism arranged to have mounted thereto at least one sensing component for collecting data from the sports surface, the sensing mechanism being configured to move the sensing component between a first position, in which said sensing component is retracted, and a second position, in which said sensing component is deployed;

an actuator configured to actuate the sensing mechanism to move said sensing component between the first and second positions; and a controller configured to control actuation of the sensing mechanism via the actuator, wherein the sensor module further comprises a load cell arranged to measure a force applied to the sensing component when inserted into the sports surface, and wherein the controller is configured to control the actuator to move the sensing mechanism to the first position if the force measured by the load cell is outside a predetermined range.

* * * * *